(12) United States Patent
Chen et al.

(10) Patent No.: US 8,953,726 B2
(45) Date of Patent: Feb. 10, 2015

(54) ANTENNA SELECTION TECHNIQUE FOR FAST DIVERSITY

(75) Inventors: Chin-Hung Chen, San Jose, CA (US); Ning Zhang, Saratoga, CA (US)

(73) Assignee: QUALCOMM Incorporated, San Diego, CA (US)

( * ) Notice: Subject to any disclaimer, the term of this patent is extended or adjusted under 35 U.S.C. 154(b) by 249 days.

(21) Appl. No.: 13/487,106

(22) Filed: Jun. 1, 2012

(65) Prior Publication Data

US 2013/0322508 A1 Dec. 5, 2013

(51) Int. Cl.
*H04B 7/08* (2006.01)

(52) U.S. Cl.
CPC .................................. *H04B 7/0814* (2013.01)
USPC ........................................................ 375/347

(58) Field of Classification Search
CPC ... H04B 7/0811; H04B 7/0802; H04B 7/0814
USPC .......................................... 375/316, 346, 347
See application file for complete search history.

(56) References Cited

U.S. PATENT DOCUMENTS

| 6,922,549 | B2 * | 7/2005 | Lyons et al. | 455/67.13 |
| 7,804,802 | B2 | 9/2010 | Stopler | |
| 7,916,081 | B2 | 3/2011 | Lakkis | |
| 2004/0259511 | A1 * | 12/2004 | Liu et al. | 455/136 |
| 2005/0095987 | A1 | 5/2005 | Lyons et al. | |
| 2007/0071149 | A1 | 3/2007 | Li et al. | |
| 2007/0076810 | A1 | 4/2007 | Herrera et al. | |
| 2008/0285686 | A1 | 11/2008 | Beaulieu et al. | |
| 2010/0254325 | A1 | 10/2010 | Narasimhan et al. | |

FOREIGN PATENT DOCUMENTS

| EP | 1193933 A2 | 4/2002 |
| WO | 2004098119 A1 | 11/2004 |

OTHER PUBLICATIONS

International Search Report and Written Opinion—PCT/US2013/043432—ISA/EPO—Sep. 17, 2013.

* cited by examiner

*Primary Examiner* — Kevin M Burd
(74) *Attorney, Agent, or Firm* — Bever, Hoffman & Harms, LLP (57) ABSTRACT

A fast diversity technique using either an EESM or a capacity computation can determine antenna selection in a wireless communication device. A fast Fourier transform (FFT) for the EESM/capacity computation can be performed with consecutive samples of a single symbol period of a short training field (STF) of a packet received by each antenna. The effective signal-to-noise ratio (SNR) for each antenna can be calculated using the results of the EESM or capacity computation. The antenna with the highest effective SNR is selected.

6 Claims, 9 Drawing Sheets

ANTENNA SELECTION TECHNIQUE FOR FAST DIVERSITY

BACKGROUND OF THE INVENTION

1. Field of the Invention

The present invention relates to antenna selection for a device in a wireless communication system, and in particular to antenna selection techniques for fast diversity.

2. Related Art

Figure 1:
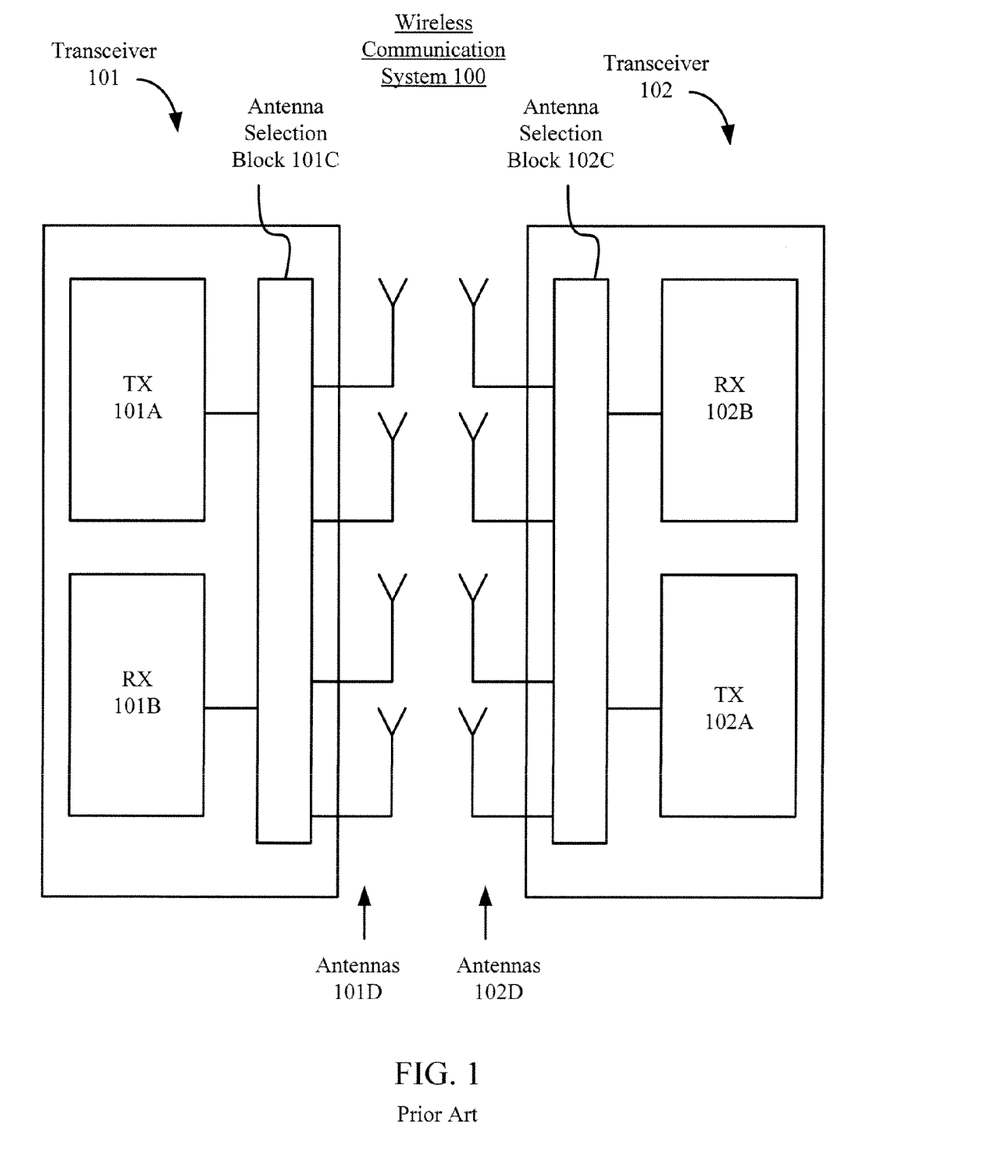
FIG. 1 illustrates an exemplary wireless communication system including multiple transceivers, each of which has multiple antennas.

FIG. 1 illustrates an exemplary wireless communication system 100 including two transceivers 101 and 102. Transceiver 101 includes a transmitter 101A, a receiver 101B, an antenna selection block 101C, and antennas 101D. Similarly, transceiver 102 includes a transmitter 102A, a receiver 102B, an antenna selection block 102C, and antennas 102D. In one embodiment of wireless communication system 100, one antenna of antennas 101D and one antenna of antennas 102D can be selected by antenna selection blocks 101C and 102C, respectively, for use by transceivers 101 and 102. In another embodiment of wireless communication system 100, multiple antennas of antennas 101D and multiple antennas of antennas 102D can be selected by antenna selection blocks 101C and 102C, respectively, for beamforming by transceivers 101 and 102.

In many environments, a transmitted signal between transceivers 101 and 102 can be reflected along multiple paths before being received (i.e. have multipath conditions). As a result, the transmitted signal can experience phase shifts, time delays, attenuations, and distortions, all of which should be corrected to be accurately decoded. Antennas 101D and 102D have different physical locations and therefore have different multipath conditions.

Antenna diversity is a known technique for improving the quality and reliability of communication between transceivers 101 and 102 by selecting antennas that successfully mitigate multipath. For example, if a first antenna of antennas 102D is experiencing significant multipath fading, it is probable that a second antenna of antennas 102D is experiencing less multipath fading. Selecting the second antenna rather than the first antenna of antennas 102D might improve system performance.

In wireless communication system 100, antenna selection blocks 101C and 102C can determine which antennas will be used for receiving packets. Antenna selection blocks 101C and 102C can be software driven (slow diversity) or hardware driven (fast diversity). Conventionally, slow diversity makes decisions by considering the long-term PER (packet error rate) history of each receive antenna. In contrast, fast diversity relies on the instantaneous receive power, e.g. the received signal strength indicator (RSSI).

Although fast diversity can track the instantaneous channel condition more quickly, both measurements and computer simulation results indicate RSSI may not be an accurate metric, especially when the power difference between receive antennas is not significant. Therefore, a need arises for a technique providing accurate fast diversity.

SUMMARY OF THE INVENTION

A fast diversity method of selecting an antenna from a plurality of antennas in a wireless communication device is provided. In this method, a packet is detected using a first antenna and a first coarse gain selection is performed for the first antenna, thereby generating a first gain setting. One or more calibration parameters can be determined for an exponential effective SINR (signal to interference plus noise ratio) mapping (EESM) computation. A fast Fourier transform (FFT) operation can be performed for the EESM computation with a first plurality of consecutive samples from a single symbol period of the short training field (STF) of the packet received by the first antenna using the first gain setting. The method can then switch to a second antenna. A second coarse gain selection can be performed for the second antenna, thereby generating a second gain setting. The FFT operation can be performed for the EESM computation with a second plurality of consecutive samples from the STF received by the second antenna using the second gain setting. An effective signal-to-noise ratio (SNR) can be calculated for the first and second antennas based on results of the EESM computations. The antenna having the highest effective SNR of the plurality of antennas can be selected.

Another fast diversity method of selecting an antenna from a plurality of antennas in a wireless communication device is provided. In this method, a packet is detected using a first antenna and a first coarse gain selection is performed for the first antenna, thereby generating a first gain setting. One or more calibration parameters can be determined for a capacity computation. A fast Fourier transform (FFT) operation can be performed for the capacity computation with a first plurality of consecutive samples from a single symbol period of the STF of the packet received by the first antenna using the first gain setting. The method can then switch to a second antenna. A second coarse gain selection can be performed for the second antenna, thereby generating a second gain setting. The FFT operation can be performed for the capacity computation with a second plurality of consecutive samples from the STF received by the second antenna using the second gain setting. An effective signal-to-noise ratio (SNR) can be calculated for the first and second antennas based on results of the capacity computations. The antenna having the highest effective SNR of the plurality of antennas can be selected.

In one embodiment, the first gain setting can be retained after switching to the second antenna. In this case, if severe analog-to-digital conversion (ADC) occurs, then the wireless device can automatically select the second antenna because the ADC saturation implies much more receive antenna power. If minimum to moderate ADC saturation occurs, then a new coarse gain selection for the second antenna can be performed, thereby generating a second gain setting. At this point, the FFT operation for the EESM/capacity computation can be performed with a third plurality of consecutive samples from the STF received by the second antenna using the second gain setting. Calculating the effective SNR and selecting the antenna can be performed based on the second gain setting. If no saturation occurs, then the method can perform the FFT for the EESM/capacity computation with the predetermined number of consecutive samples of the STF received by the second antenna using the first gain setting.

A wireless device configured to perform the above-described steps is also provided.

DETAILED DESCRIPTION OF THE DRAWINGS

Fast diversity techniques can quickly track the instantaneous channel condition in order to select antenna(s) in a wireless communication system. Conventional fast diversity techniques rely on the RSSI of a transmit signal. Unfortunately, the RSSI may not be an accurate metric when the power difference between receive antennas is not significant.

As described in detail below, a fast diversity technique using either an exponential effective SINR (signal to interference plus noise ratio) mapping (EESM) or a capacity computation can accurately determine best antenna selection in a wireless communication device even when the power difference between receive antennas is not significant. A fast Fourier transform (FFT) for the EESM/capacity computation can be performed with consecutive samples of a single symbol period of the short training field (STF) received by each antenna. The effective signal-to-noise ratio (SNR) for each antenna can be calculated using the results of the EESM or capacity computation. The antenna with the highest effective SNR is selected.

An EESM can compress a vector of received SINR values to a single effective value $SINR_{eff}$. With $SINR_{eff}$, a packet error rate (PER) can be predicted by looking up a pre-generated PER table. The general form of the EESM mapping equation is:

$$SINR_{eff} = -\beta ln\left(\frac{1}{N}\sum_{j=1}^{N} \exp\left(-\frac{\gamma_j}{\beta}\right)\right) \quad \text{Eq. 1}$$

where N is the number of data subcarriers, $\gamma_i$ is the SNR on each subcarrier, $\beta$ is a calibration parameter that depends on the modulation and coding scheme (MCS). As indicated in Equation 1, the PER (packet error rate) of a packet is dominated by low-SINR (or deeply faded) subcarriers. Specifically, because there is a minus sign in the exp( ) term, those deeply faded channels will have smaller $\gamma_i$ and hence result in larger $\exp(-\gamma_i)$. As a result, these deeply faded channels will become dominant terms in the summation operation $$\sum_{j=1}^{N} \exp\left(-\frac{\gamma_j}{\beta}\right).$$

Figure 2A:
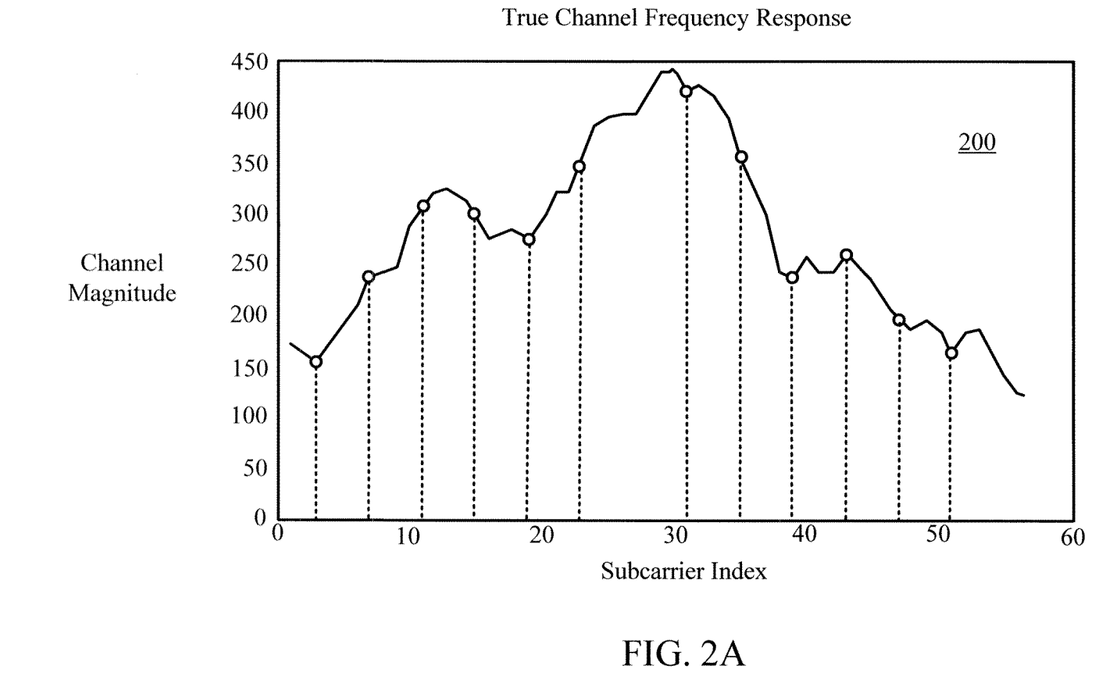
FIG. 2A illustrates a graph plotting channel magnitude versus subcarrier index, i.e. an exemplary estimated channel response, when receiving a 20 MHz WLAN packet.

In accordance with one embodiment of a fast diversity technique, the results of computing the EESM equation based on samples collected during a single short training field (STF) symbol period can be used for antenna selection in a wireless communication system. For example, in a 20 MHz WLAN packet, the STF uses 12 of the 52 subcarriers and has a total period of 8 s, i.e. 10 repetitions of a 0.8 s symbol in time domain. FIG. 2A illustrates a graph 200 plotting channel magnitude versus subcarrier index, i.e. an exemplary true estimated channel response, when receiving a 20 MHz WLAN packet.

At the receiver side, after coarse gain settling, a fast Fourier transform (FFT) can be performed on an arbitrary 0.8 s period of the STF (i.e. a single STF symbol period). Note that the period does not have to coincide with the symbol, e.g. the period could straddle portions of two symbols. Although the absolute start point does not matter, different start point will cause different phase response. However, in one embodiment, only the magnitude (not the phase response) will be measured.

Figure 2B:
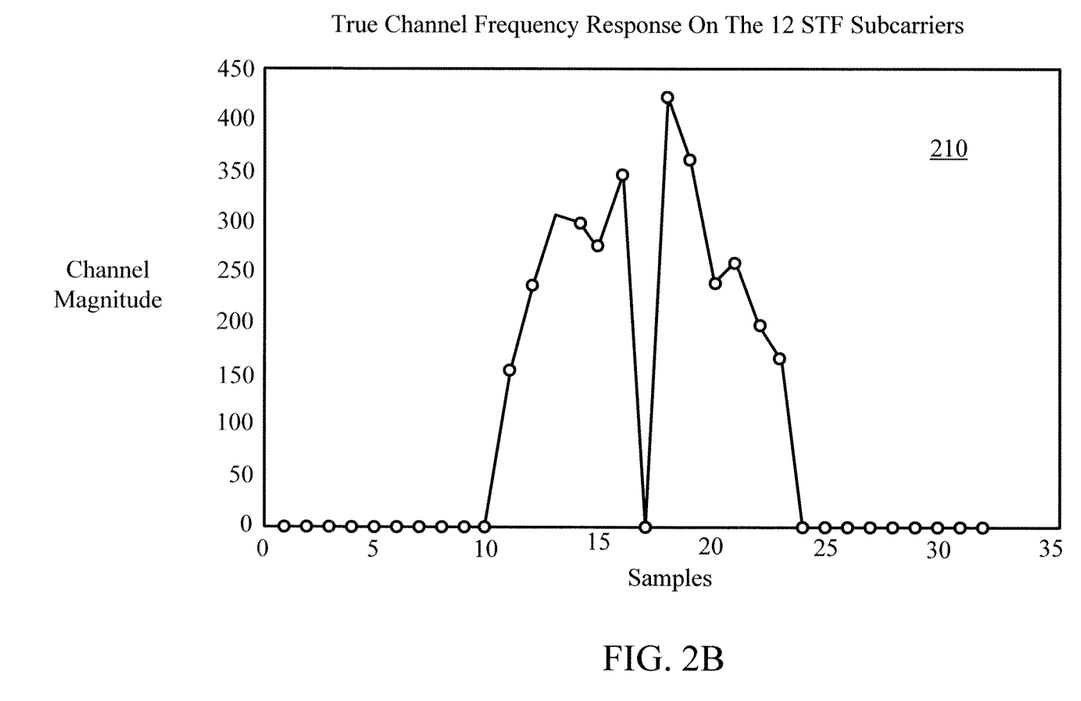
FIG. 2B illustrates a graph plotting the decimated version of the estimated channel magnitude on the 12 STF subcarriers, when receiving a 20 MHz WLAN packet._
Figure 2C:
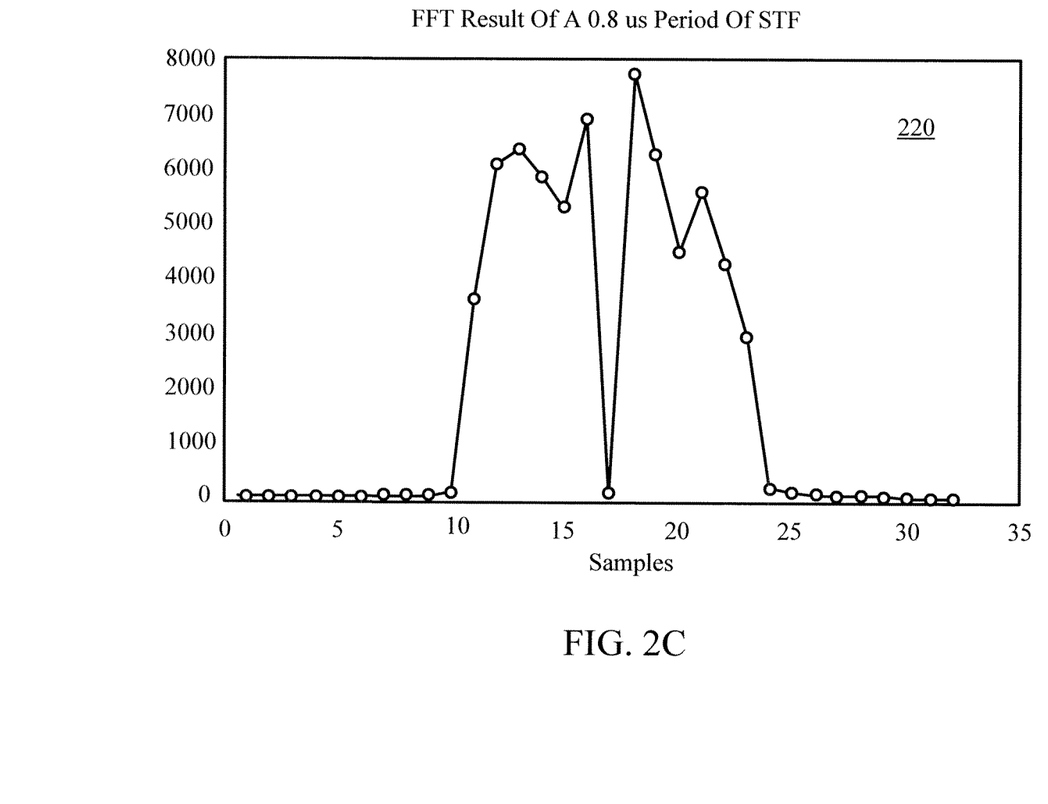
FIG. 2C illustrates a graph plotting the magnitude of the FFT results, when receiving a single symbol period of STF.

In one embodiment, assuming a 40 MHz ADC sampling rate, 32 consecutive samples can be used in the FFT. Advantageously, the FFT output accurately matches the decimated version of the estimated channel frequency response. FIG. 2B illustrates a graph 210 plotting the estimated channel magnitude on the 12 STF subcarriers, when receiving a 20 MHz WLAN packet. In contrast, FIG. 2C illustrates a graph 220 plotting the magnitude of the FFT results, when using a single STF symbol period. Notably, graph 220, which shows the FFT output, accurately matches the decimated version of graph 200, which shows the true estimated channel frequency response.

For a 2-antenna 1-stream receiver, for example, by applying the 12 valid points (located at the 12 STF subcarriers) to the EESM equation set 2 below, the effective SNR can be derived for each receive antenna. Then, the antenna corresponding to the highest $SNR_{eff}$ can be selected.

$$\begin{cases} SNR_{1,eff} = -\beta \cdot ln\left(\frac{1}{12}\sum_{i=1}^{12} \exp\left(-\frac{\gamma_{1,i}}{\beta}\right)\right) = \\ \quad -\beta \cdot ln\left(\frac{1}{12}\sum_{i=1}^{12} \exp\left(-\frac{|h_{1,i}|^2/\alpha_1}{|n_{1,i}|^2/\beta}\right)\right) \\ SNR_{2,eff} = -\beta \cdot ln\left(\frac{1}{12}\sum_{i=1}^{12} \exp\left(-\frac{\gamma_{2,i}}{\beta}\right)\right) = \\ \quad -\beta \cdot ln\left(\frac{1}{12}\sum_{i=1}^{12} \exp\left(-\frac{|h_{2,i}|^2/\alpha_2}{|n_{2,i}|^2/\beta}\right)\right) \end{cases} \quad \text{Eq. set 2}$$

$$\text{if } \sum_{i=1}^{12} \exp\left(-\frac{|h_{1,i}|^2/\alpha_1}{|n_{1,i}|^2/\beta}\right) < \sum_{i=1}^{12} \exp\left(-\frac{|h_{2,i}|^2/\alpha_2}{|n_{2,i}|^2/\beta}\right) \Rightarrow$$

$$SNR_{1,eff} > SNR_{2,eff}$$

As indicated in equation set 2, there are four parameters to consider when calculating the effective SNR: $|h_i|^2$: the channel power of the specified subcarrier i, $\alpha$: the total gain (analog gain+digital gain) applied for calculating $|h|^2$, $|n|^2$: noise floor (equally across subcarriers), and $\beta$: MCS dependent calibration factor.

Note that when the STF is received, the MCS used for the packet is still unknown. However, based on the above parameters 1, 2, and 3, a workable MCS can be predicted to determine a suitable β. If the actual MCS is far from the predicted one, a significantly-biased β will result in unreliable selection. However, in that case, the actual MCS might be too good or too bad for the current channel condition, so using different receive antennas will make no performance difference.

The wireless device uses its automatic gain control (AGC) to appropriately scale the incoming signal. In general, the AGC amplifies a weak signal and lessens a strong signal. Thus, the AGC setting can indicate an input signal power. This input signal power and a noise floor (which is typically available in the receiver of the wireless device) can be used to predict a SNR. There is generally a direct relationship between the SNR and the PER, as known by those skilled in the art. A "workable" MCS, as described above, refers to a 10% PER.

Figure 3A:
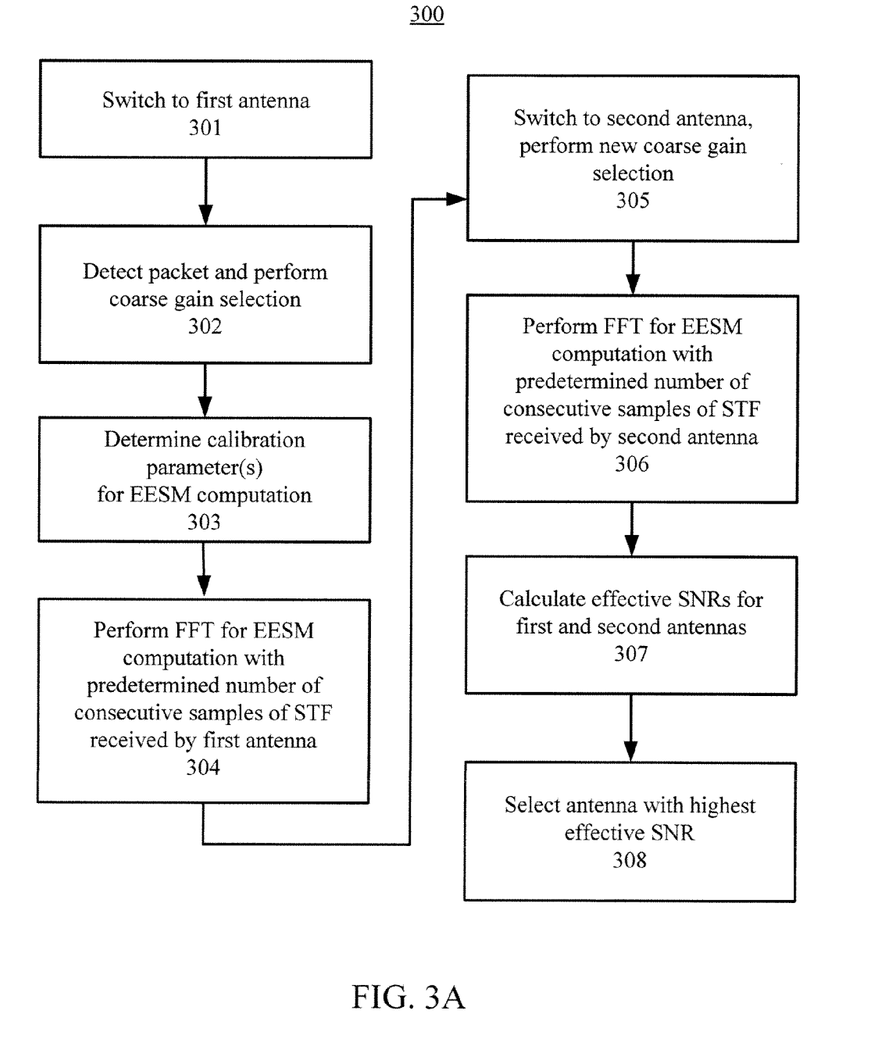
FIG. 3A illustrates an exemplary technique for selecting between multiple antennas in a wireless communication device using an EESM computation.

FIG. 3A illustrates an exemplary technique 300 for selecting between antennas in a wireless communication device using the above-described EESM computation. Step 301 can switch to a first antenna. Step 302 can detect a packet using the first antenna and perform a first coarse gain selection for the first antenna, thereby generating a first gain setting. Step 303 can determine one or more calibration parameters for an exponential effective SINR mapping (EESM) computation. Step 304 can perform a fast Fourier transform (FFT) operation for the EESM computation with a first plurality of consecutive samples from a first single symbol period of a short training field (STF) of the packet received by the first antenna using the first gain setting.

Step 305 can switch to a second antenna and then perform a second coarse gain selection for the second antenna, thereby generating a second gain setting. Step 306 can perform the FFT operation for the EESM computation with a second plurality of consecutive samples from a second single symbol period of the STF received by the second antenna using the second gain setting. Step 307 can calculate an effective signal-to-noise ratio (SNR) for the first and second antennas based on results of the EESM computations. Step 308 can select the antenna of the plurality of antennas having a highest effective SNR.

Figure 3B:
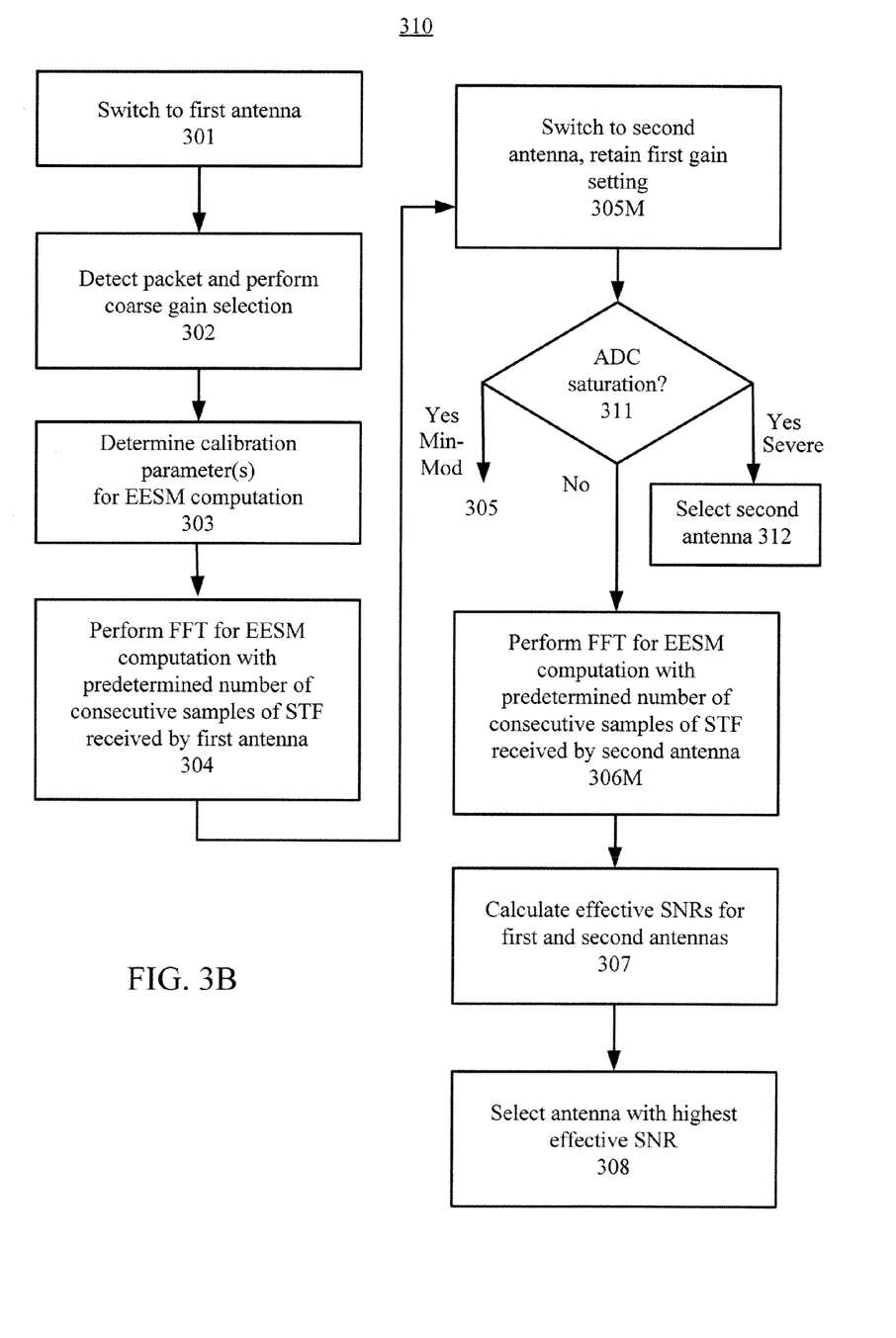
FIG. 3B illustrates another exemplary technique for selecting between multiple antennas in a wireless communication device using an EESM computation.

In another embodiment shown in FIG. 3B, an exemplary technique 310 for selecting between antennas in a wireless communication device can modify the gain setting and add two additional steps. Specifically, step 305 (FIG. 3A) can be replaced by step 305M, which switches to the second antenna, but retains the first gain setting. A step 311 can determine whether an analog to digital conversion (ADC) saturation occurs when using the first gain setting. If the saturation is severe, then step 312 can directly select the second antenna because it implies much more receive antenna power. If the saturation is minimal to moderate, then technique 310 can return to step 305 (and then proceed to steps 306-308 of FIG. 3A). Note that to determine the level of ADC saturation, the number of saturated samples within a given measurement length can be monitored. If that number of saturated samples exceeds a predefined percentage threshold, e.g. 20%, then the saturation can be characterized as severe. In one embodiment, any saturation greater than 0 and less than the predefined percentage threshold can be characterized as "minimum to moderate". If there is no saturation, then step 306M (which replaces step 306, FIG. 3A) can perform the FFT for the EESM computation with the predetermined number of consecutive samples of the STF received by the second antenna using the first gain setting. All other steps in technique 310 are performed as described in FIG. 3A.

Besides EESM, other performance metrics, such as a capacity formula, can also be used to determine fast diversity antenna selection. For a 2-antenna 1-stream receiver, for example, by applying the 12 valid points (located at the 12 STF subcarriers) to the capacity equation set 3 below, the effective SNR can be derived for each receive antenna. Then, the antenna corresponding to the highest $SNR_{eff}$ can be selected.

$$\begin{cases} C_{1,avg} = \frac{1}{12} \sum_{i=1}^{12} \min\left(log_2\left(1 + \frac{|h_{1,i}|^2/\alpha_1}{|n_{1,i}|^2 \cdot a}\right), b\right) \\ C_{2,avg} = \frac{1}{12} \sum_{i=1}^{12} \min\left(log_2\left(1 + \frac{|h_{2,i}|^2/\alpha_2}{|n_{2,i}|^2/\beta}\right), b\right) \end{cases} \Rightarrow \begin{cases} SINR_{1,eff} = a \cdot (2^{C_{1,avg}} - 1) \\ SINR_{2,eff} = a \cdot (2^{C_{2,avg}} - 1) \end{cases}$$

$$\text{if } \sum_{i=1}^{12} \min\left(log_2\left(1 + \frac{|h_{1,i}|^2/\alpha_1}{|n_{1,i}|^2 \cdot a}\right), b\right) > \sum_{i=1}^{12} \min\left(log_2\left(1 + \frac{|h_{2,i}|^2/\alpha_2}{|n_{2,i}|^2/\beta}\right), b\right) \Rightarrow SINR_{1,eff} > SNR_{2,eff}$$

Eq. set 3

As indicated in equation set 3, there are five parameters to consider when calculating the effective SNR:
1. $|h_i|^2$: the channel power of the specified subcarrier i,
2. α: the total gain (analog gain+digital gain) applied for calculating $|h|^2$,
3. $|n|^2$: noise floor (equally across subcarriers),
4. α: a MCS dependent correction factor, and
5. b: another MCS dependent correction factor (b=$log_2$M), and used to prevent the per-tone capacity from exceeding $log_2$M due to the finite M-ary constellation size.

As indicated in the Eq. set 3, high-SNR subcarriers will be clipped and compressed more (owing to the $log_2$(.) operation) during the effective SNR calculation, and therefore has similar implications as EESM. As in EESM, it also means low-SNR subcarriers will dominate the final $SNR_{eff}$ calculation results.

Figure 4A:
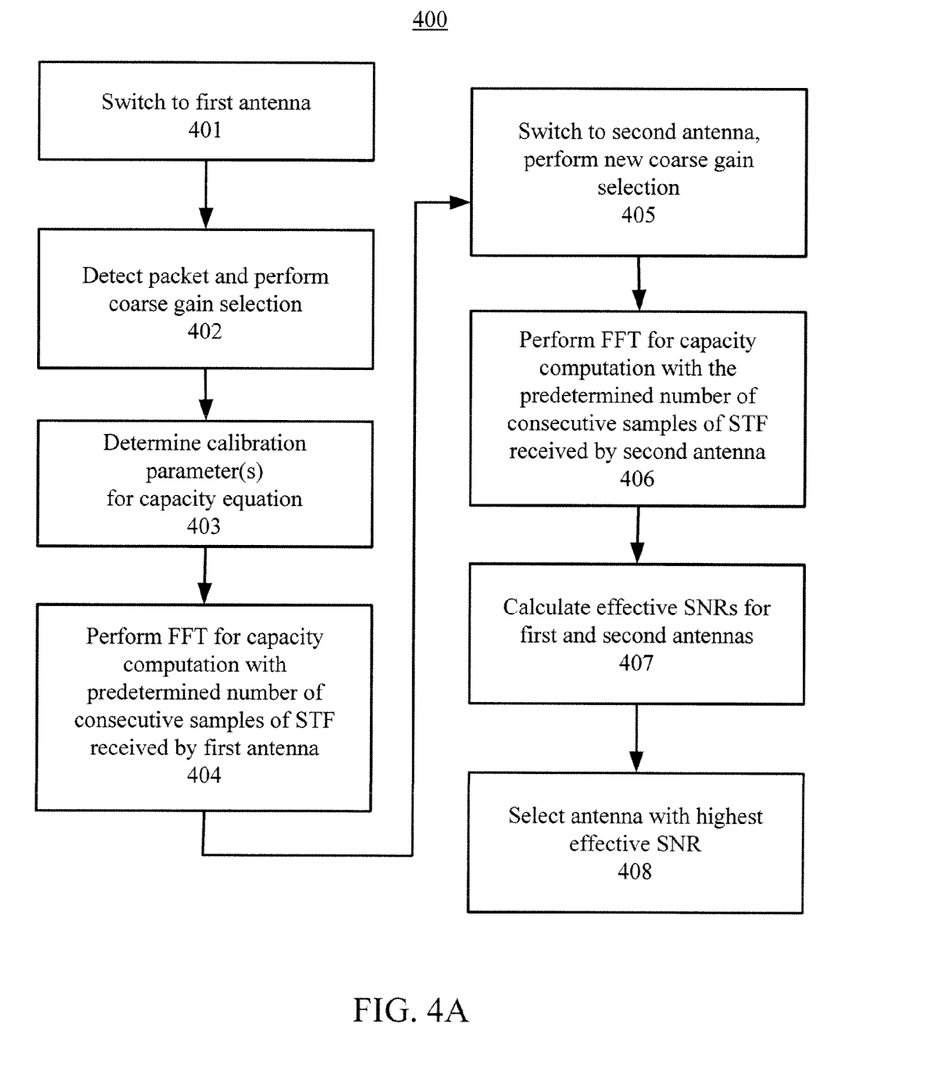
FIG. 4A illustrates an exemplary technique for selecting between multiple antennas in a wireless communication device using a capacity computation.

FIG. 4A illustrates an exemplary technique 400 for selecting between antennas in a wireless communication device using the above-described capacity computation. Step 401 can switch to a first antenna. Step 402 can detect a packet using the first antenna and perform a first coarse gain selection for the first antenna, thereby generating a first gain setting. Step 403 can determine one or more calibration parameters for a capacity computation. Step 404 can perform a fast Fourier transform (FFT) operation for the capacity computation with a first plurality of consecutive samples from a first single symbol period of a short training field (STF) of the packet received by the first antenna using the first gain setting.

Step 405 can switch to a second antenna, and then perform a second coarse gain selection for the second antenna, thereby generating a second gain setting. Step 406 can perform the FFT operation for the capacity computation with a second plurality of consecutive samples from a second single symbol period of the STF received by the second antenna using the second gain setting. Step 407 can calculate an effective signal-to-noise ratio (SNR) for the first and second antennas based on results of the capacity computations. Step 408 can select the antenna of the plurality of antennas having a highest effective SNR.

Figure 4B:
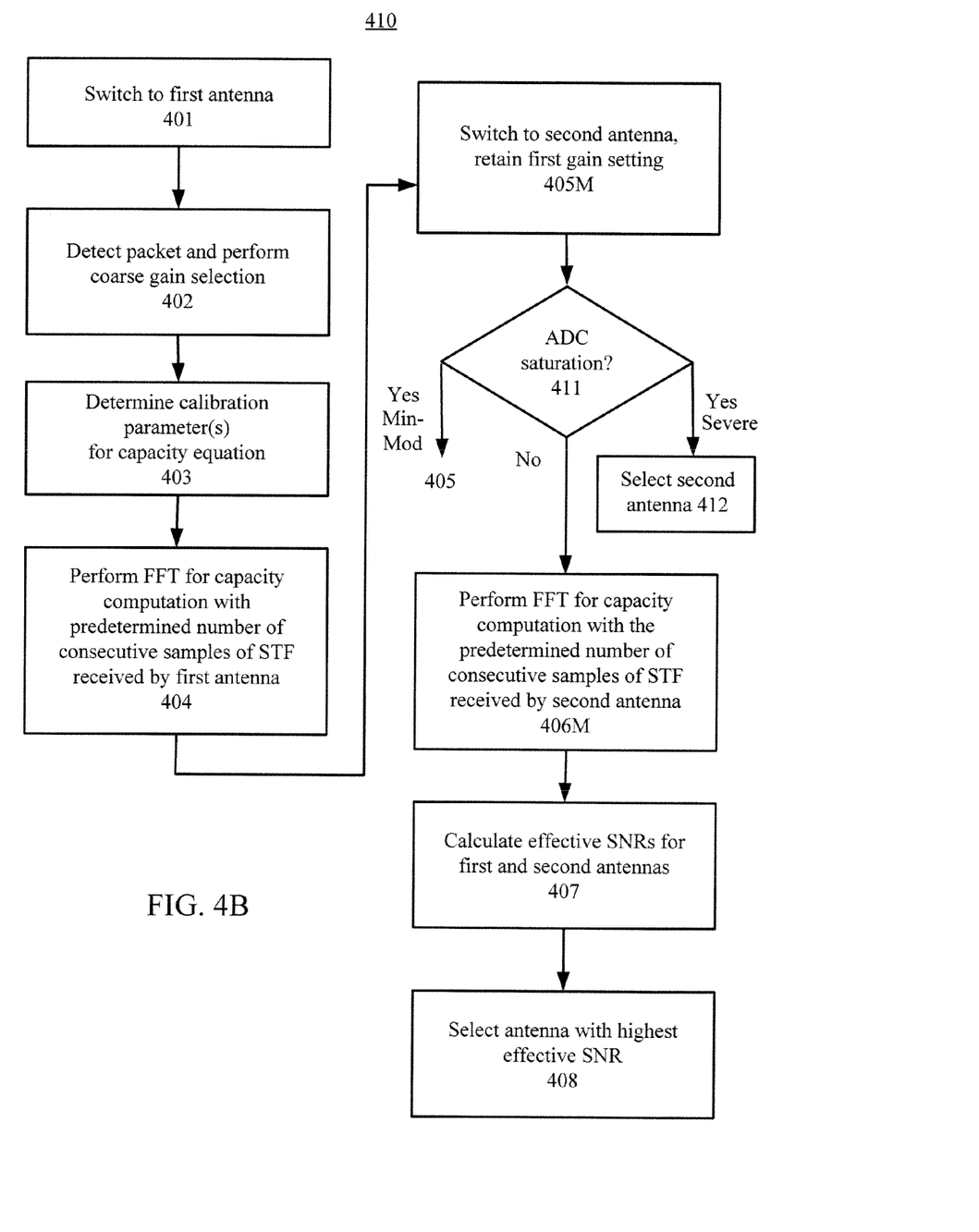
FIG. 4B illustrates another exemplary technique for selecting between multiple antennas in a wireless communication device using a capacity computation.

In another embodiment shown in FIG. 4B, an exemplary technique 410 for selecting between antennas in a wireless communication device can modify the gain setting and add two additional steps. Specifically, step 405 (FIG. 4A) can be replaced by step 405M, which switches to the second antenna, but retains the first gain setting. A step 411 can determine whether an analog to digital conversion (ADC) saturation occurs when using the first gain setting. If the saturation is severe, then step 412 can directly select the second antenna because it implies much more receive antenna power. If the saturation is minimal to moderate, then technique 410 can return to step 405 (and then proceed to steps 406-408 of FIG. 4A). As described above, if the number of saturated samples exceeds a predefined percentage threshold, e.g. 20%, then the saturation can be characterized as severe. In one embodiment, any saturation greater than 0 and less than the predefined percentage threshold can be characterized as "minimum to moderate". If there is no saturation, then step 406M (which replaces step 406, FIG. 4A) can perform the FFT for the EESM computation with the predetermined number of consecutive samples of the STF received by the second antenna using the first gain setting. All other steps in technique 410 are performed as described in FIG. 4A.

Note that the EESM and capacity computations can be expressed using different equations. Generically, the EESM computation can be expressed as:

$$SINR_{\textit{eff}} = -\alpha \cdot ln\left(\frac{1}{N}\sum_{j=1}^{N} exp\left(\frac{-min(\gamma_j, y_{max})}{\beta}\right)\right) \quad \text{Eq. 4}$$

and the capacity computation can be expressed as:

$$C_{\alpha,\beta} = \frac{1}{N}\left(\sum_{j=1}^{N} min\left(log_2\left(1 + \frac{min(\gamma_j, y_{max})}{\alpha}\right), \beta\right)\right) \quad \text{Eq. 5}$$

$$SINR_{\textit{eff}} = \alpha \cdot (2^{C_{avg}} - 1)$$

where N is the number of data subcarriers, $\gamma_i$ is the SNR on each subcarrier, and $\gamma_{max}$ is a SNR threshold used to clip $\gamma_i$ because in real system, the true SNR will be limited by TX/RX EVM. Table 1 provides exemplary values of $\alpha$ and $\beta$ for various MCSs (indicated by index number per the 802.11a standard) when using EESM computation (Eq. 4) and capacity computation (Eq. set 5).

TABLE 1

| Mapping Table | | | | | | | | | |
|---|---|---|---|---|---|---|---|---|---|
| MCS | | 0 | 1 | 2 | 3 | 4 | 5 | 6 | 7 |
| EESM | α | 1.0 | 2.5 | 2.5 | 7.0 | 10.0 | 33.0 | 34.0 | 34.0 |
| EESM | β | 0.5 | 1.5 | 1.5 | 6.0 | 9.0 | 33.0 | 33.0 | 31.0 |
| CAP | α | 3.5 | 3 | 2.5 | 1.5 | 2.0 | 1.5 | 1.5 | 2 |
| CAP | β | 1 | 2 | 2 | 4 | 4 | 6 | 6 | 6 |

As described above, either the EESM or the capacity computation can be used to accurately select an antenna in a wireless communication device. Notably, both of these equations take into account frequency selectivity. A channel can be characterized in either a time domain or a frequency domain. In the time domain, if the channel response is "long", then it will be frequency selective. Frequency selective means that the channel response can go up and down dramatically across the frequency domain (see, e.g. FIG. 2B). On the other hand, if the channel response is "short", then it will not be frequency selective. In this case, the channel response will change very smoothly across the frequency spectrum. The EESM and capacity computations provide an accuracy that is not provided by a fast diversity technique using only RSSI because the RSSI computation does not take into account frequency selectivity.

Figure 5:
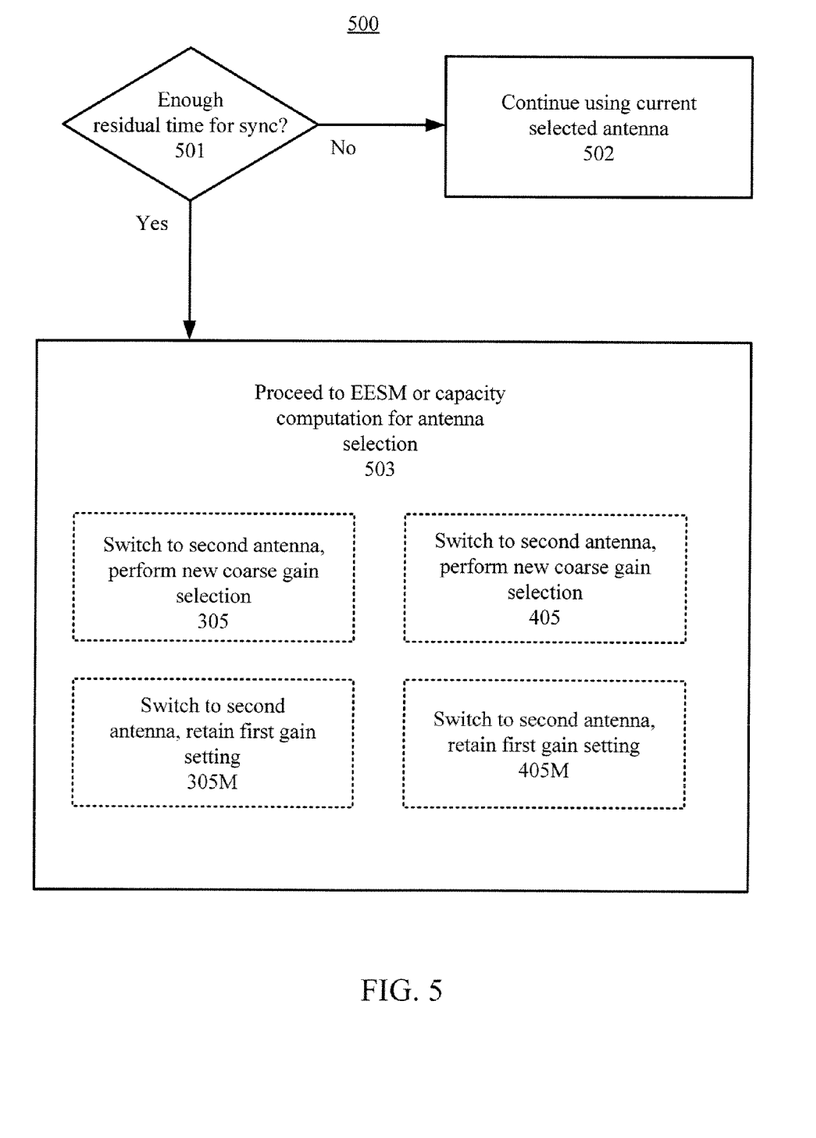
FIG. 5 illustrates an exemplary technique for selecting between multiple antennas in a wireless communication device used when a strong signal may be detected.

In one embodiment, for a strong signal, the AGC may take a long time to settle. In this case, the fast diversity antenna selection may be skipped so as not to impact the follow-up synchronization process. FIG. 5 illustrates an exemplary technique 500 including determining whether a gain change procedure should be performed or not. In technique 500, step 501 determines whether there is enough residual time for the follow-up synchronization process (e.g. at least 4 STFs can be used for DC offset, frequency, and symbol timing estimation). If so, then step 503 begins, wherein step 503 can be one of steps 305, 305M, 405, and 405M (in one embodiment, hardware can be used to estimate the residual time to check if it is enough to allow switching to the second antenna (that is, step 305, 305M, 405, or 405M) to proceed with the $SNR_{\textit{eff}}$ calculation on the second antenna). If not, then step 502 will continue using the current antenna.

As described above, a fast diversity technique using either an EESM computation or a capacity computation can accurately determine best antenna selection in a wireless communication device. A fast Fourier transform (FFT) for the EESM/capacity computation can be performed with consecutive samples of a single symbol period of the short training field (STF) received by each antenna. Note that consecutive samples are critical because each STF symbol has an identical pattern. The effective signal-to-noise ratio (SNR) for each antenna can be calculated using the results of the EESM or capacity computation. The antenna with the highest effective SNR is selected.

Note that although the above description refers to selection between first and second antennas, the EESM/capacity computation can be equally applied to choosing A antennas from B antennas, wherein A and B are integers and B>A. For example, where A=2 and B=4, the EESM/capacity computation can be performed for first and second antennas as well as for third and fourth antennas to determine which two of the four antennas should be selected for use (e.g. beamforming).

In one wireless device, a default antenna may be designated. In this case, the "first" antenna may be the default antenna and any other antenna may be an alternate antenna.

The above-described fast diversity techniques can be implemented using one or more computer programs that execute in a transceiver including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors, as well as other types of micro-controllers. Generally, a processor will receive instructions and data from a read-only memory and/or a random access memory. Generally, a computer will include one or more mass storage devices for storing data files; such devices include magnetic disks, such as internal hard disks and removable disks, magneto-optical disks, and optical disks. Storage devices suitable for tangibly embodying computer program instructions and data include all forms of non-volatile memory, including by way of example semiconductor memory devices, such as EPROM, EEPROM, and flash memory devices, magnetic disks such as internal hard disks and removable disks, magneto-optical disks, and CDROM disks. Any of the foregoing can be supplemented by, or incorporated in, application-specific integrated circuits (ASICs).

The various embodiments of the invention that are described above are illustrative only of the principles of this invention and are not intended to limit the scope of the invention to the particular embodiments described. Thus, the invention is limited only by the following claims and their equivalents.

The invention claimed is:

1. A method of selecting an antenna from a plurality of antennas in a wireless communication device, the method comprising:
   detecting a packet using a first antenna and performing a first coarse gain selection for the first antenna, thereby generating a first gain setting;
   determining one or more calibration parameters for one or more exponential effective SINR (signal to interference plus noise ratio) mapping (EESM) computations;
   performing a fast Fourier transform (FFT) operation for a first EESM computation of the one or more EESM computations with a first plurality of consecutive samples from a single symbol period of a short training field (STF) of the packet received by the first antenna using the first gain setting;
   switching to a second antenna;
   determining whether analog-to-digital conversion (ADC) saturation occurs after switching to the second antenna; and
   when no ADC saturation occurs after switching to the second antenna:
      performing a FFT operation for a second EESM computation of the one or more EESM computations with a second plurality of consecutive samples from the STF received by the second antenna using the first gain setting;
      calculating an effective signal-to-noise ratio (SNR) for the first and second antennas based on results of the first and second EESM computations; and
      selecting the antenna from the plurality of antennas, the antenna having a highest effective SNR of the plurality of antennas; and
   when ADC saturation occurs after switching to the second antenna:
      determining a level of ADC saturation, and when the level of ADC saturation exceeds a predetermined threshold, selecting the second antenna without performing a FFT operation for the one or more EESM computations with samples received by the second antenna.

2. The method of claim 1, further comprising:
   when the level of ADC saturation does not exceed the predetermined threshold, then
      performing a new coarse gain selection for the second antenna, thereby generating a second gain setting;
      performing a FFT operation for a third EESM computation of the one or more EESM computations with a third plurality of consecutive samples from the STF received by the second antenna using the second gain setting;
      calculating the effective SNR for the first and second antennas based on results of the first and third EESM computations; and
      selecting the antenna from the plurality of antennas, the antenna having a highest effective SNR of the plurality of antennas.

3. A method of selecting an antenna from a plurality of antennas in a wireless communication device, the method comprising:
   detecting a packet using a first antenna and performing a first coarse gain selection for the first antenna, thereby generating a first gain setting;
   determining one or more calibration parameters for one or more exponential effective SINR (signal to interference plus noise ratio) mapping (EESM) computations;
   performing a fast Fourier transform (FFT) operation for a first EESM computation of the one or more EESM computations with a first plurality of consecutive samples from a single symbol period of a short training field (STF) of the packet received by the first antenna using the first gain setting;
   switching to a second antenna;
   determining whether analog-to-digital conversion (ADC) saturation occurs after switching to the second antenna; and
   when no ADC saturation occurs after switching to the second antenna:
      performing a FFT operation for a second EESM computation of the one or more EESM computations with a second plurality of consecutive samples from the STF received by the second antenna using the first gain setting;
      calculating an effective signal-to-noise ratio (SNR) for the first and second antennas based on results of the first and second EESM computations; and
      selecting the antenna from the plurality of antennas, the antenna having a highest effective SNR of the plurality of antennas; and
   when ADC saturation occurs after switching to the second antenna:
      determining a level of ADC saturation, and when the level of ADC saturation does not exceed a predetermined threshold, then:
         performing a new coarse gain selection for the second antenna, thereby generating a second gain setting;
         performing a FFT operation for a third EESM computation of the one or more EESM computations with a third plurality of consecutive samples from the STF received by the second antenna using the second gain setting;
         calculating the effective SNR for the first and second antennas based on results of the first and third EESM computations; and
         selecting the antenna from the plurality of antennas, the antenna having a highest effective SNR of the plurality of antennas.

4. A method of selecting an antenna from a plurality of antennas in a wireless communication device, the method comprising:
   detecting a packet using a first antenna and performing a first coarse gain selection for the first antenna, thereby generating a first gain setting;

determining one or more calibration parameters for one or more capacity computations;

performing a fast Fourier transform (FFT) operation for a first capacity computation of the one or more capacity computations with a first plurality of consecutive samples from a single symbol period of a short training field (STF) of the packet received by the first antenna using the first gain setting;

switching to a second antenna;

determining whether analog-to-digital conversion (ADC) saturation occurs after switching to the second antenna; and when no ADC saturation occurs after switching to the second antenna:
- performing a FFT operation for a second capacity computation of the one or more capacity computations with a second plurality of consecutive samples from the STF received by the second antenna using the first gain setting;
- calculating an effective signal-to-noise ratio (SNR) for the first and second antennas based on results of the first and second capacity computations; and
- selecting an antenna of the plurality of antennas having a highest effective SNR; and when ADC saturation occurs after switching to the second antenna:
- determining a level of ADC saturation; and
- when the level of ADC saturation exceeds a predetermined threshold, selecting the second antenna without performing a FFT operation for the one or more capacity computations with samples received by the second antenna.

5. The method of claim 4, further comprising:

when the level of ADC saturation does not exceed the predetermined threshold, then
- performing a new coarse gain selection for the second antenna, thereby generating a second gain setting;
- performing a FFT operation for a third capacity computation of the one or more capacity computations with a third plurality of consecutive samples from the STF received by the second antenna using the second gain setting
- calculating the effective SNR for the first and second antennas based on results of the first and third capacity computations; and
- selecting the antenna from the plurality of antennas, the antenna having a highest effective SNR of the plurality of antennas.

6. A method of selecting an antenna from a plurality of antennas in a wireless communication device, the method comprising:

detecting a packet using a first antenna and performing a first coarse gain selection for the first antenna, thereby generating a first gain setting;

determining one or more calibration parameters for one or more capacity computations;

performing a fast Fourier transform (FFT) operation for a first capacity computation of the one or more capacity computations with a first plurality of consecutive samples from a single symbol period of a short training field (STF) of the packet received by the first antenna using the first gain setting;

switching to a second antenna;

determining whether analog-to-digital conversion (ADC) saturation occurs after switching to the second antenna; and when no ADC saturation occurs after switching to the second antenna:
- performing a FFT operation for a second capacity computation of the one or more capacity computations with a second plurality of consecutive samples from the STF received by the second antenna using the first gain setting;
- calculating an effective signal-to-noise ratio (SNR) for the first and second antennas based on results of the first and second capacity computations; and
- selecting an antenna of the plurality of antennas having a highest effective SNR; and when ADC saturation occurs after switching to the second antenna:
- determining a level of ADC saturation, and when the level of ADC saturation does not exceed a predetermined threshold, then:
  - performing a new coarse gain selection for the second antenna, thereby generating a second gain setting;
  - performing a FFT operation for a third capacity computation of the one or more capacity computations with a third plurality of consecutive samples from the STF received by the second antenna using the second gain setting;
  - calculating the effective SNR for the first and second antennas based on results of the first and third capacity computations; and
  - selecting the antenna from the plurality of antennas, the antenna having a highest effective SNR of the plurality of antennas.

* * * * *